US012508594B2

(12) United States Patent
Wollenhaupt et al.

(10) Patent No.: US 12,508,594 B2
(45) Date of Patent: Dec. 30, 2025

(54) HIGH-PRESSURE ROLLER PRESS

(71) Applicant: MASCHINENFABRIK KÖPPERN GMBH & CO. KG, Hattingen (DE)

(72) Inventors: Gereon Wollenhaupt, Witten (DE); Malte Ebermann, Hattingen (DE); Oliver Fischer, Cologne (DE); Eggert De Weldige, Velbert-Langenberg (DE)

(73) Assignee: MASCHINENFABRIK KOEPPERN GMBH & CO. KG, Hattingen (DE)

( * ) Notice: Subject to any disclaimer, the term of this patent is extended or adjusted under 35 U.S.C. 154(b) by 259 days.

(21) Appl. No.: 18/274,332

(22) PCT Filed: Dec. 15, 2021

(86) PCT No.: PCT/EP2021/086001
§ 371 (c)(1),
(2) Date: Jul. 29, 2023

(87) PCT Pub. No.: WO2022/174957
PCT Pub. Date: Aug. 25, 2022

(65) Prior Publication Data
US 2024/0091784 A1 Mar. 21, 2024

(30) Foreign Application Priority Data
Feb. 16, 2021 (DE) ........................ 102021103573.2

(51) Int. Cl.
*B02C 4/02* (2006.01)
*B02C 4/28* (2006.01)

(52) U.S. Cl.
CPC ................ *B02C 4/02* (2013.01); *B02C 4/283* (2013.01)

(58) Field of Classification Search
CPC .................................. B02C 4/02; B02C 4/283
See application file for complete search history.

(56) References Cited

U.S. PATENT DOCUMENTS 647,894 A 4/1900 Barmettler
1,050,183 A 1/1913 Wall
(Continued)

FOREIGN PATENT DOCUMENTS

DE 665 141 A 9/1938
DE 1116036 A 2/1961
(Continued)

*Primary Examiner* — Mohammed S. Alawadi
(74) *Attorney, Agent, or Firm* — Andrew Wilford

(57) ABSTRACT

A high-pressure roller press has a press frame and two main rollers rotatable about respective main-roller axes in the press frame, together forming a filling funnel level with the main-roller axes, and having a gap width that is variable during operation of the roller press. Respective end plates axially flank and delimit the filling funnel between axially outwardly directed end faces of the main rollers. Respective end rollers are movable axially inward toward the end plates with each end roller laterally adjacent the main rollers vertically level with the roller gap, rotatably mounted about its end-roller axis, and laterally delimiting the roller gap, the end rollers being movable relative to the respective end plates. The end plates can each be urged by biasing forces axially toward of the respective main-roller end faces, whereas they are axially outward against the biasing forces during operation of the roller press.

21 Claims, 5 Drawing Sheets

(56) References Cited

U.S. PATENT DOCUMENTS

| | | | | | |
|---|---|---|---|---|---|
| 2,904,829 | A | | 9/1959 | Heck | |
| 3,242,530 | A | * | 3/1966 | Hirsch | B22F 3/18 425/363 |
| 4,167,377 | A | * | 9/1979 | Oakley | B22F 3/18 425/363 |
| 4,231,729 | A | * | 11/1980 | Tundermann | B22F 3/18 425/363 |
| 4,905,917 | A | * | 3/1990 | Fetzer | B02C 23/02 241/101.8 |
| 5,269,477 | A | | 12/1993 | Buchholtz | |
| 5,386,946 | A | | 2/1995 | Fetzer | |
| 2006/0255197 | A1 | | 11/2006 | McIvor | |
| 2012/0061501 | A1 | | 3/2012 | Kounosu | |
| 2021/0121892 | A1 | | 4/2021 | Gardula | |
| 2023/0052046 | A1 | | 2/2023 | De Weldige | |

FOREIGN PATENT DOCUMENTS

| | | | |
|---|---|---|---|
| DE | 3635762 | A | 4/1988 |
| DE | 3701965 | A | 8/1988 |
| EP | 2314723 | A | 4/2011 |
| EP | 3358024 | A | 8/2018 |

* cited by examiner

HIGH-PRESSURE ROLLER PRESS

CROSS REFERENCE TO RELATED APPLICATIONS

This application is the US-national stage of PCT application PCT/EP2021/086001 filed 15 Dec. 2021 and claiming the priority of German patent application 102021103573.2 itself filed 16 Feb. 2021.

FIELD OF THE INVENTION

The invention relates to a roller press or high-pressure roller press, in particular a particle-stream roller mill or compacting machine.

BACKGROUND OF THE INVENTION

Such a press typically has two main rollers rotatably mounted in a press frame (and driven in opposite directions) between which there is a filling funnel with a compression zone and a roller gap at the level of the main-roller axes, the gap width being variable during operation, and the filling funnel is delimited axially between the main rollers (or the roller gap) at the main roller ends by (two) end plates laterally flanking the main rollers and movable and biased (or prestressed) against the press frame in such a way that the end plates are pressed axially against the biasing force during operation of the roller press (for example during an oblique position of a main roller) and thus also obliquely.

Such a roller press is used in particular for the comminution of material, in particular of highly abrasive material, for example ore, cement clinker, slag or ceramic base materials or the compacting of for example fertilizers. The roller press is used for example for high-pressure comminution and is then also referred to as a particle-stream roller mill. Alternatively, however, the roller press can also be used for compacting material. In particle-stream roller mills, the individual particles of the stream are not broken as in the case of a crusher between the surfaces of the two main rollers, but rather they are in a bed of material or the particle-stream is pressed under high pressure and thus comminuted highly efficiently. When the material is compacted in a roller press, the particulate stream is pressed between the main rollers to form a slug (for example in the compacting of fertilizers). The two main rollers of a roller press are driven in opposite directions. Preference is given to one of the main rollers as a fixed main roller and the other press roll is movable, and this movable main roller can be displaced relative to the fixed main roller, namely relative to the fixed main roller with a variable gap width. For this purpose, the movable main roller can be biased toward the fixed main roller via force-generating means, for example hydraulically and/or pneumatically, and is thus supported so as to also be supported by a hydro-pneumatic spring. The gap between the main rollers is self-established until a certain pressure acts between the main rollers. The gap width results from the ratio of the pressing force of the hydraulic system to the reaction force of the material being processed.

Axially the roller gap or hopper with the compression zone is delimited by end plates that are fastened to the press frame and that, in practice, are also referred to as "cheek plates" or "filling-funnel delimiters" or "filling funnel end plates." They are frequently adapted in their shape to the zone and taper in a funnel shape toward rotation of the main rollers or in the conveying direction (the "filling funnel") between the main rollers.

If, in practice, a uniform supply of the feed material over the main roller width cannot be ensured, an oblique position of the main rollers relative to one another or the movable main roller is permitted relative to the fixed main roller, so that a rolling gap with nonuniform a gap width over the main roller width can also be set during operation. In the case of main rollers of conventional size, such oblique positions lie at the ends on the order of several millimeters to several centimeters. For this reason, the end plates are not rigidly fastened to the press frame, but can be pressed back against a biasing force, for example spring-loaded or also hydraulically prestressed. The use of such a spring-mounted end plates has proven to be excellent in practice.

However, the end plates are in use subject to high wear. It is therefore known to provide the end plates with a wear-protection layer. Thus, for example, DE 10 2018 113 440 [US 2021/0121892] describes a roller press in which, for the wear-protection layer of the end plates, on the one hand plate-shaped wear protection elements and, on the other hand, pin-shaped wear protection elements can be used in the high-pressure zone.

In order to reduce the friction at the end plates and thus the wear, WO 2006/124425 [US 2006/0255197] proposes a plurality of movable elements arranged in the form of a matrix on the end plates, and can be designed, for example, like the main rollers. The main rollers distributed in a matrix-like manner on the "cheek plates" are intended to permit movement of the surface with the material and thus reduce the friction and consequently the wear.

In an alternative concept, end plates fastened to the press frame are dispensed with and, instead, limiting elements, for example, are provided on one of the main rollers as a circumferential flange that is connected to one of the main roller in a rotationally fixed manner so that this lateral flange rotates with the one main roller and consequently is moved with the speed of the material. In this way, the wear at the limiting elements can be reduced. However, it is disadvantageous that these lateral flanges do not readily permit an angled position of the movable main roller so that a homogeneous material strip is not outputted over the machine width. Such a roller mill with a lateral flange for limiting the rolling gap is described, for example, in DE 3,701,965. In the case of such a solution with a lateral flange, it is also possible to have a certain oblique position In DE 10 2018 108 690 [US 2021/0121892], elastic deformation of the flanges is permitted. However, such measures are relatively expensive.

Moreover, U.S. Pat. No. 647,894 discloses a roller press with a laterally fixedly mounted "cheek platform" where main rollers are provided at the usually provided lower sections of the "cheek platform" that laterally delimit the pressing gap. They consequently replace the lower part of the conventional end plates and should in particular serve to reduce wear. However, both the cheek plates and the main rollers are stationary during operation. Only for the purpose of adjustment is movement of the main rollers possible with the aid of screw bolts.

In a roller press that serves for making briquettes, lateral fill-shaft boundaries are provided with special wear protection. For this purpose, a frame can be inserted into a cutout of the fill shaft, in which frame a plurality of main rollers are arrayed one after the other (cf. DE 665,141).

Furthermore, an apparatus for rolling strips of metal powder is known in which a movable disk rotating with the main roller is provided on each side of the one main roller for laterally delimiting the roll caliber (cf. DE 1,116,036). Similar devices are known from U.S. Pat. Nos. 2,904,829 and 4,237,729.

Moreover, roller presses are also known for compacting directly reduced iron at high temperatures (cf. EP 2,314,723 and EP 3,358,024). Lateral "cheek plates" are also possible in these presses. The "cheek plates" are provided in the upper region with recesses that allow angled orientation of the screw conveyors.

DE 3,635,762 describes a roller mill in which the end walls of the feed shaft are provided with special storage elements intended to have an open honeycomb structure.

EP 2 505 346 [US 2012/0061501] describes end plates for the briquetting of material with a high moisture content, these end plates each having a curved region into which special bodies are integrated so that drainage channels are formed.

Finally, U.S. Pat. No. 1,050,183 discloses a roller press with end plates that are designed in the shape of a box and form material pockets for receiving material.

Moreover, older, unpublished German patent application DE 10 202 0 104 526 [US 2023/0052046] relates to a high-pressure roller press of the type described above, with end plates that can be pressed back against application of force during operation of the roller press. A single main roller is fastened to each of the end plates vertically level with the roller gap and is mounted rotatably about its end-roller axis and laterally delimits the roller gap. In each of the end plates, a single main roller is consequently integrated.

OBJECT OF THE INVENTION

Proceeding from the previously known prior art, the object of the invention is to provide a high-pressure roller press, in particular a particle-stream roller mill or compacting machine, of the type described above that, with a simple construction, is achieved by an improved mode of operation and, in particular, a high comminution or compacting performance.

SUMMARY OF THE INVENTION

To achieve this object, the invention teaches a high-pressure roller press of the generic type that is equipped with biased end plates. In addition to the end plates, a single end roller is laterally next to each axial end of the main rollers and level the roller gap, mounted rotatably about its end-roller axis and laterally delimiting the roller gap, these end rollers being movable relative to the respective end plates (for example horizontally) and are each biased toward the respective main-roller end faces in such a way that the end rollers can be pressed back against the biasing force during operation of the press. Each of the two end plates has a respective single end roller so that overall (only) two end rollers are present, each movable relative to the respective end plate (horizontally). The end-roller axes are oriented perpendicular to the main-roller axes or perpendicular to the fixed main-roller axis of the fixed main roller (and perpendicular to the transport direction of the material through the roller gap).

The invention is primarily based on the discovery that it is advantageous to provide the basically known, biased end plates (cheek plates) so that, unlike in the case of the solutions with limiting flanges on the main rollers, a non-parallel position of the main rollers or an angled position of the movable main roller relative to the fixed main roller can be permitted in a simple manner. This embodiment has the great advantage that overloading of the machine or of the filling funnel delimiters is reliably avoided without having at the same time to ensure a uniform supply of the feed material over the full width of the main rollers.

According to the invention, friction at the high-pressure zone is reduced in that a single end roller is additionally provided for each of the movable end plates. Such a single end roller at an end plate means that a plurality of end rollers are not provided one above the other, but rather only a single end roller is rotatable at each axial end of the high-pressure zone. However, this embodiment does not exclude that such a single end roller is composed of a plurality of end roller sections or end roller parts that can be rotated next to one another about the same axis. Preferably, these end rollers or end roller sections, possibly rotating next to one another about the same axis, have, however, a (one-piece) end roller shell continuous over the width and the outer surface, so that in particular there is no danger that material jams in a gap between the individual end rollers or end roller sections.

According to the invention, the end roller is not mounted directly rotatably on the respective end plate, but it is movable horizontally relative to the respective end plate, i.e. it is movable horizontally independently of the end plate and can be biased toward the main-roller end faces. This is preferably realized in a structurally preferred manner in that the end rollers are mounted on the press frame in a movable and biased manner independently of the respective end plates. Both the end plates and the end rollers are each consequently pressed by for example a spring element against the respective main-roller end face in a force-proof manner, but preferably with respective separate spring elements. During operation of the roller press, the end plates can consequently preferably be pressed back by the material independently of the main rollers. The spring elements acting on the end rollers, on the one hand, and the spring elements acting on the end plates, on the other hand, are preferably matched to one another in such a way that a greater pressure is exerted with the end rollers on the material (in the hopper) is applied as with the end plates. Consequently, during operation of the roller press, the end plates can preferably be pressed back more easily than the end rollers.

In a preferred embodiment, the end rollers are each rotatably mounted on or in at least one end-roller mount attached to the press frame in a movable and biased manner specifically preferably independent of the respective end plate. The end-roller mount consequently carries the rotatable end roller and preferably the bearings in which the end roller is rotatably mounted. The end-roller mount itself is biased, for example by a corresponding spring element. This makes it possible to bias the end roller toward the end face of the main rollers independently of the end plate with, for example, its own spring element. In this case, it is expedient if the end plates each have a hole through which the respective end roller passes. The end roller is preferably rotatably mounted in a region axially behind the end plate, for example on the above-mentioned end-roller mount. The end rollers each engage through the hole in the respective end plate, specifically into the region of the end faces of the main rollers.

The end-roller mount is preferably realized as an inexpensive end-roller mount that can be pivoted about an pivot axis, preferably as a rocker pivoted about an pivot axis on the press frame. Alternatively, the respective end-roller mount can be positioned so as to be axially displaceable (on the press frame), for example each on a respective horizontal linear guide so that the end-roller mount or holders are formed by axially slidable components or the axially displaceable roller bearings. Both the end plates and the end-roller mounts are consequently respectively fastened to the press frame and according to the invention force are independently spring-loaded.

Preferably, the end rollers or the respective end-roller mounts are each biased by at least one spring element braced, for example, against the press frame and acting against the respective end roller or the end-roller mount. However, this is not the spring element with which the end plate is biased, but rather a separate spring element assigned to the respective end roller.

The spring element for applying force to the end roller can be a mechanical spring, for example as a metallic spring or the like. However, this spring element is preferably a hydraulic spring element or alternatively as a pneumatic spring element, for example as a hydraulic cylinder. Particularly preferably, a spring element is used whose spring force is variably adjustable, for example here as a hydraulic cylinder or alternatively also as a pneumatic cylinder. Thus, in particular, the spring force (for example during assembly) to the respective conditions, specifically in particular in comparison with the spring force of the spring element with which the end plate is axially biased. There is the possibility of adjusting the spring force in a variable manner during assembly and not changing during operation. Alternatively, however, it is also within the scope of the invention to use a spring element whose spring force is adjustable during operation or, if necessary, also controlled or controllable, for example as a function of operating parameters of the roller press and/or of measured values, for example as a function of the oblique position of the main rollers or of the pressure in the roller gap.

Independently of the spring element for the end rollers, spring elements are provided for the end plates also mechanical or hydraulic or pneumatic spring means. It is preferred for the end plates to be used in a simple manner in the case of simple mechanical feed-through directions, for example helical springs or the like. In principle, however, it is also possible to use for the end plate spring elements to exert spring forces that are adjustable during operation or can optionally also be controlled with or without feedback.

According to the invention, the individually biased end rollers and the individually biased end plates (in combination) are therefore of particular importance.

In a particularly preferred embodiment of the invention, the end plates each have a material-guiding pocket that is integrated into the end plate specifically above the end roller at the end plate, so that the end roller is acted upon by material from above via this material-guiding pocket. The recessed material-guiding pocket is set axially back with respect to an inner face of the end plate wherein the inner face is the plane of the end plate facing the main-roller end faces and oriented parallel to the main-roller end faces. The material-guiding pocket consequently has a rear wall that is set back relative to this inner face and is spaced apart from the inner face (at least) in some regions and that is preferably curved. In a side view, the material-guiding pocket is particularly preferably configured in the shape of a funnel with a downwardly tapering width. Alternatively or additionally, the material-guiding pocket has a downwardly tapering depth, so that overall a funnel-shaped material-guiding pocket is realized with which the material is supplied from above to the end roller below.

Alternatively, the end plate can have a material-guiding pocket that, in side view, is formed in some regions like a funnel with a downwardly tapering width that, however, does not have a tapering depth. In this embodiment (with a vertical rear wall) as well, the rear wall can preferably be curved.

As a result of the material guiding pockets that are integrated in the end plates and that are of preferred significance in combination with the end rollers, an excess of feed material or material to be fed is provided at the axially outer ends of the main rollers where the material is comminuted and at the same time where friction between the feed material and the end plate occurs is moved "to the outside" by the recessed rear wall of the material-guiding pocket from the main-roller end face. Thus, the material flows better at the main-roller ends and is better drawn into the roller gap. Thus, in practice, in the case of conventional "cheek plates" or end plates this counteracts the effect whereby less material is drawn into the roller gap in the ends and thus also less material is comminuted or compacted. Overall, the effectiveness of the roller press is consequently improved over the width of the roller gap. At the same time, rotation of the provided end rollers reduces the friction at the high-pressure zone considerably and thus on the one hand wear on the end plates is minimized and, on the other hand, material distribution over the gap width is improved. As a result, the crushing or compacting performance of the roller press is increased overall.

The biased end roller at the end plate is consequently of particular importance in combination with the material-guiding pockets. Preferably, the end roller is dimensioned and positioned such that the upper vertex of the end roller is above the main-roller axes and/or in that the lower apex of each of the main rollers is below the end-roller axes. In any case, the two end rollers at the two end plates are vertically positioned at the compression zone of the roller press. The lower zone of the hopper of the roller press, which extends between the two main rollers preferably over a circumferential angle of −5° to +15°, is defined as the compression zone of the roller gap and extends relative to a straight line through the centers of the two main rollers. The roll gap is vertically level with the main-roller axes and consequently at a circumferential angle of 0°. Consequently, the compression zone is preferably by definition the region that lies between +15° above the main-roller axis and −5° below the main-roller axis. The end-roller axes are at the main-roller axes and consequently also at the compression zone. The dimensioning and arrangement of the end rollers is preferably carried out in such a way that the upper vertices of the end rollers are above the compression zone (based on the height of the compression zone). Alternatively or additionally, the lower vertices of the end rollers are below the compression zone. The axes of the end rollers are (approximately) vertically level with the main-roller axes.

The diameter of the end rollers is preferably adapted to the main-roller diameter of the main rollers, in that the end-roller diameter is at least 5% of the main-roller diameter, preferably at least 10% of the main-roller diameter. The end-roller diameter can for example be is about 5% to 35%, e.g. 10% to 30% of the main-roll diameter. The main-roll diameter is typically between 1000 mm and 3000 mm, e.g. 1200 mm to 2000 mm. By way of example, the end-roller diameter can be at least 50 mm, preferably at least 100 mm, particularly preferably at least 200 mm. Thus, the end-roller diameter can be, for example, 50 mm to 1000 mm, preferably 100 mm to 600 mm, for example 200 mm to 450 mm.

The width of the end roller is preferably greater than the maximum width of the roller gap and consequently greater than the preset zero gap plus at least the distance by which the roller gap opens during machine operation. The axial width of the end roller can be at least 1%, preferably at least 2%, of the main-roller diameter, for example at least 50 mm, preferably at least 60 mm. Particularly preferably, the width of the end roller is about 1% to 10%, z B 2% to 8% of the main-roller diameter. For example, the end roller may have a width of 50 mm to 200 mm, e.g. 60 mm to 100 mm. The width of the end roller means the width of the (outer) working surface of the end roller and consequently the width of the cylindrical outer surface of the end roller.

The end roller is intended to reduce the lateral friction in the compression or high-pressure zone. In addition, the end roller is intended to feed additional material from the hopper above the main roller and transport it via the material-guiding pocket into the gap and consequently convey material into the region of the roll gap. This is achieved, inter alia, by the corresponding dimensioning and also the orientation of the end rollers at the described height. The effect can be further improved by providing the main roller with a surface that is profiled or structured (on the outer surface of the main roller). Thus, for example, pin-like wear elements (so-called "studs") can be used that serve for example from EP 0 516 952 [U.S. Pat. No. 5,269,477] for finishing of the main roller surface of main rollers of a particle-stream roller mill or that, according to DE 10 2018 113 440, are also referred to as wear-protection elements at end or cheek plates.

Supply of the material to the end rollers via the material-guiding pockets or material funnels can moreover be improved by the use of guide formations that are integrated in the material-guiding pockets in a suitable manner. Alternatively or additionally, the end plates can be provided with additional sealing plates that run parallel to the inner face or in the inner face and partially cover the material-guiding pocket on the front side. These sealing plates, which also improve supply of the material from the material-guiding pockets into the region of the end roller, are described in more detail in the description of the figures.

In principle, it is possible to use end rollers without a drive, so that the end rollers are rotated passively by the material that has been fed to and moved by the main rollers. Preferably, the end rollers are (indirectly) driven by the main rollers by pressing the end rollers with their outer edge faces against the axial end faces of the main rollers. This is because the outer surfaces of the main rollers are larger than the roller gap, so that the end rollers with their outer surfaces (working surfaces) can be pressed against the end faces of the main rollers, for example, by axially inwardly biasing the end rollers so as to drive the end rollers by the main rollers. However, it is also possible to provide the end rollers with a drive so that actively driven end rollers are used that are preferably driven at the same circumferential speed as the main rollers. In this way, the friction at the main rollers can be reduced particularly well. Optionally, the rotational speed or the circumferential speed can also be somewhat faster than that of the main roller surfaces in order to optimize the conveying effect of the material in the roller gap.

The preferably provided provision of the recessed material-guiding pockets at the end plates also leads to this material being pushed over the end faces of the main rollers into the material-guiding pockets and thence into the grinding gap. This has the advantage that the grinding gap is supplied with additional material. It may be advantageous to also protect the end faces of the main rollers against wear, so that measures for reducing wear are optionally provided at the end faces that are usually used at the outer surface of the main rollers, for example a suitable armoring. Optionally, structuring at the end faces of the main rollers may also be expedient in order to increase the effect of drawing in the material.

The fact that, within the scope of the invention, an oblique position of the main rollers relative to one another or an angled position of the movable main roller relative to the fixed main roller is explicitly permitted is of particular importance. The movable main roller can press the end plates in a conventional manner to the side or back, so that the end plate bears against the two main-roller end faces or main roller flanks. The same applies to the preferably separately spring-loaded end rollers.

BRIEF DESCRIPTION OF THE DRAWING

The invention is explained below with reference to drawings, that however merely show one embodiment of the invention. Therein.

SPECIFIC DESCRIPTION OF THE INVENTION

Figure 1:
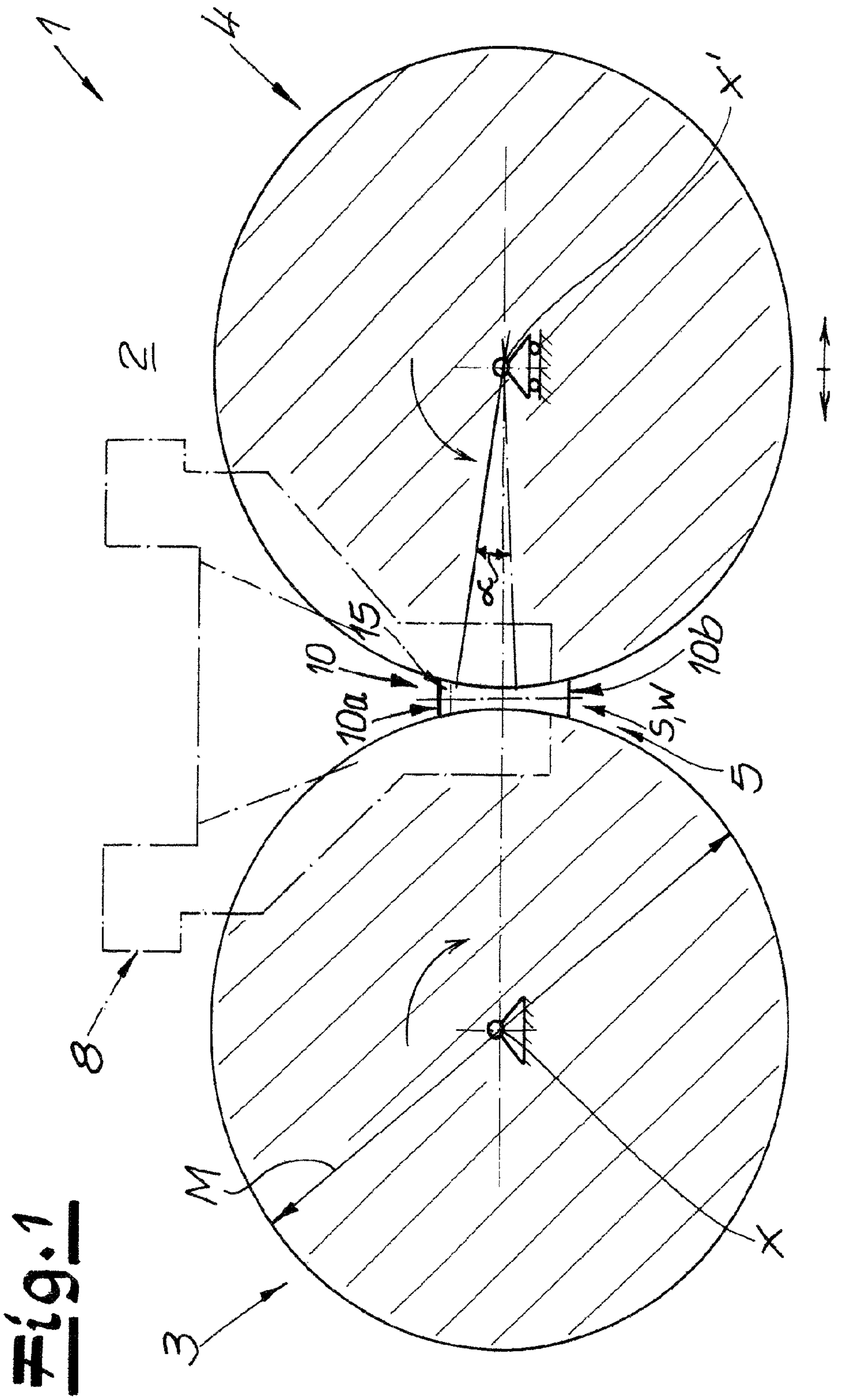
FIG. 1 is a greatly simplified schematic vertical section through both main rollers of a roller press.

Referring now to the drawing in detail and first, particularly, to FIG. 1 thereof, there is shown a high-pressure roller press 1 a particle-stream roller mill or compacting machine. It has a press frame 2 and two main rollers 3 and 4 driven in the directions of the arrows and mounted in the press frame [2]. A funnel-shaped region, the so-called filling funnel, is formed between the main rollers. The lower region of this filling funnel is a compression zone 5. A roller gap S defined at a level of the main-roller axes X and X' has a gap width W that is variable during operation of the roller press 1. This is because the main roller 3 is fixed and the other main roller 4 is movable and is connected to biasing means, for example a hydraulic actuator B that urges it (in a horizontal plane) toward the fixed main roller 3, so that the width W of the roller gap S changes within certain limits during operation. The roll gap S or the gap width W is set along the roller gap until a certain pressure is effective between the main rollers. This means that the main-roller axes X and X' are in a common horizontal plane and are parallel to one another in a starting position (at "zero gap"). During operation, however, the movable main roller 4 can tilt relative to the fixed main roller 3 about a vertical axis and consequently in a horizontal plane, so that the main-roller axes X and X' are during operation always at the same height and consequently in a horizontal plane but can be oriented within this plane at a certain angle with respect to one another.

The material is fed from above via a feed shaft (not shown in more detail) and is drawn into the compression zone by the counter rotation of the main rollers and is comminuted (or compacted) there under the action of the existing milling pressure. The filling funnel formed between the main rollers and in particular the compression zone 5 at its lower end, are delimited at axial ends of the main rollers 3 and 4 by end plates 8 axially flanking the main rollers 3 and 4 and in practice also referred to as filling-funnel delimiters or "cheek plates." These end plates 8 are movable relative to the press frame 2, namely biased in for example by springs 9, the application of force acting axially on main-roller end faces 6. During operation, the end plates 8 can be pushed axially out against the biasing force for example of the springs 9. This is essential because in such a roller press the already mentioned oblique position of the main rollers 3 and 4 is intentionally permitted.

Figure 2:
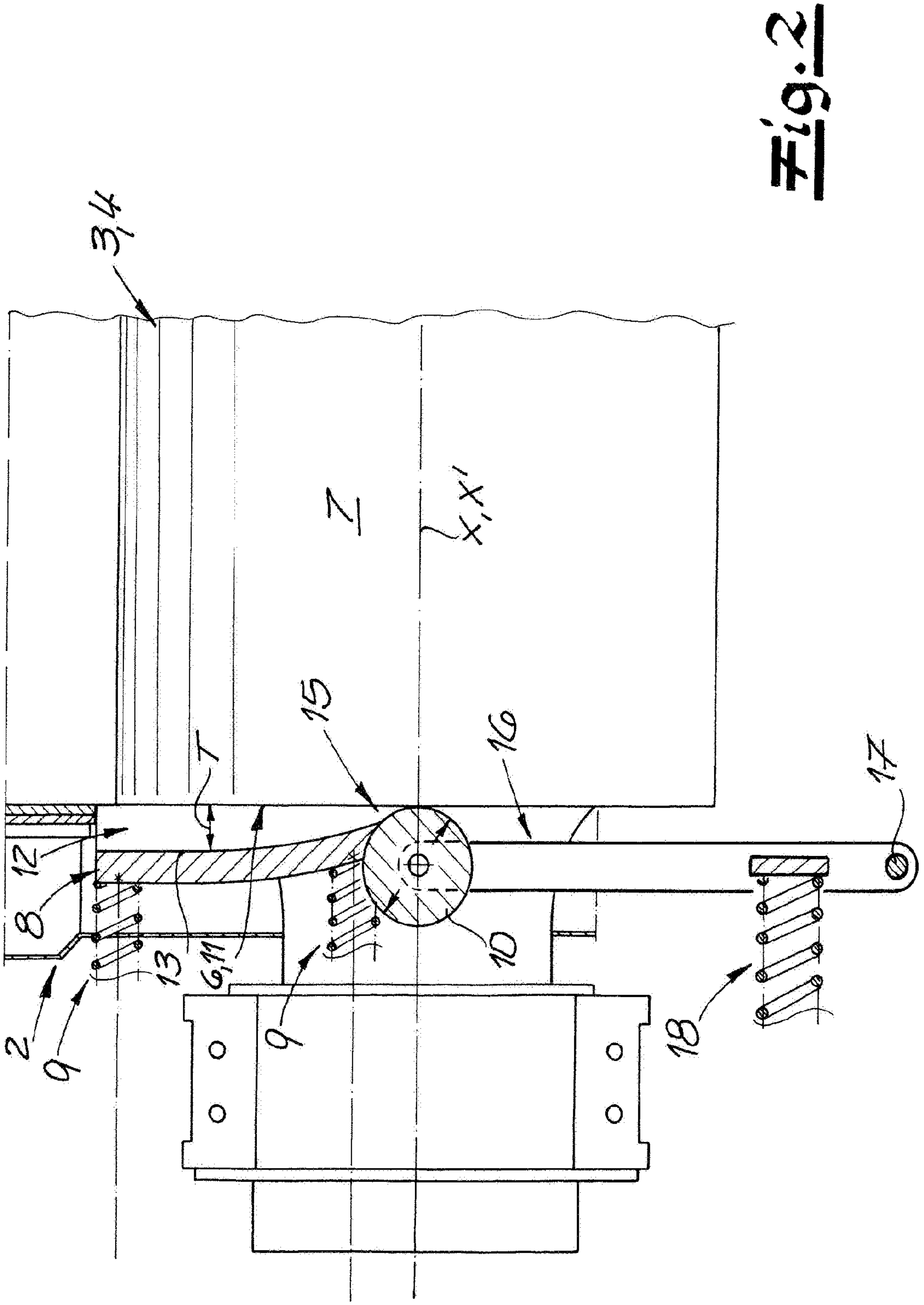
FIG. 2 is a vertical section through the roller gap of a roller press according to the invention in a detail view.
Figure 4:
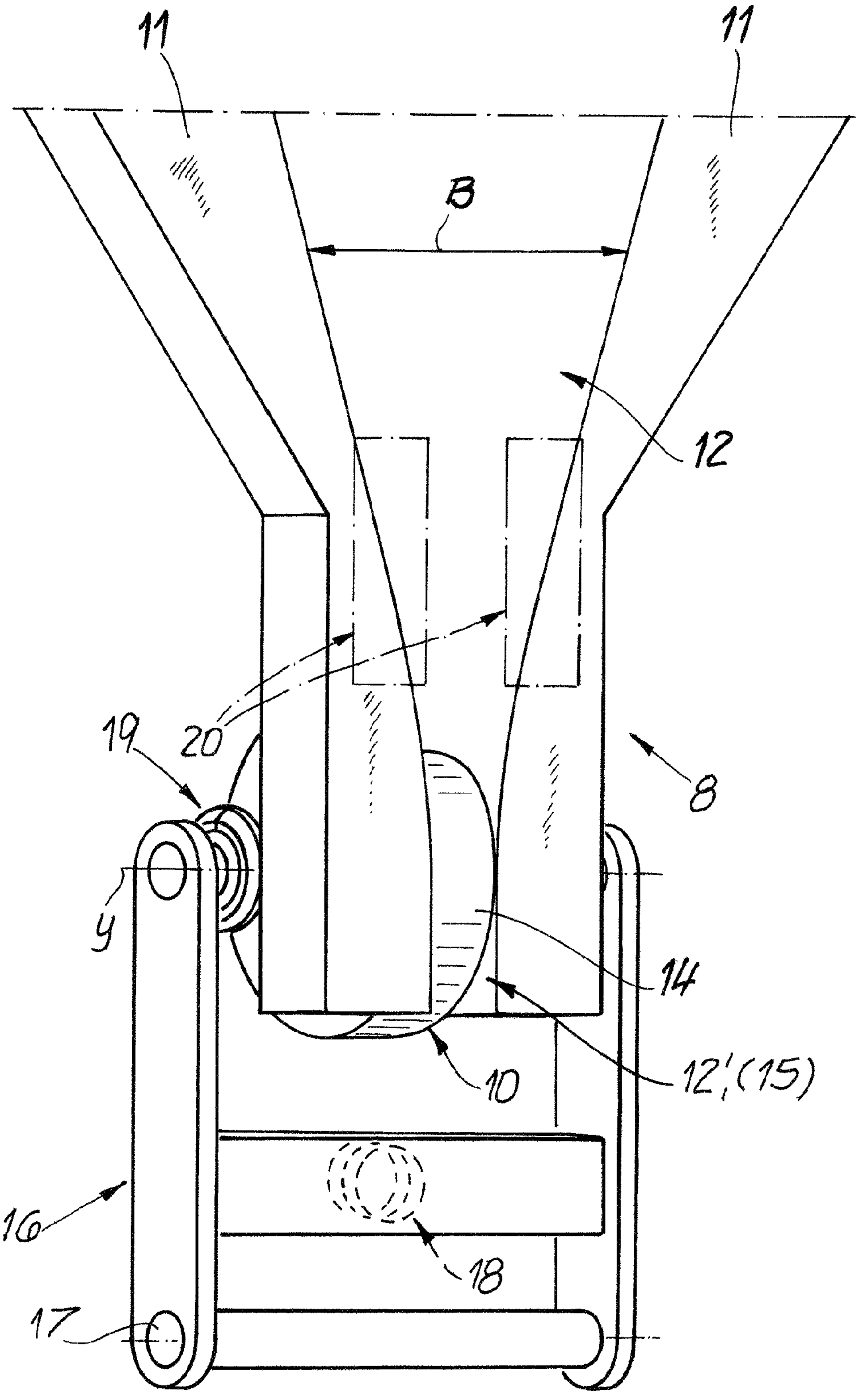
FIG. 4 is a perspective view from inside of a end plate according to the invention with the end roller.
Figure 5:
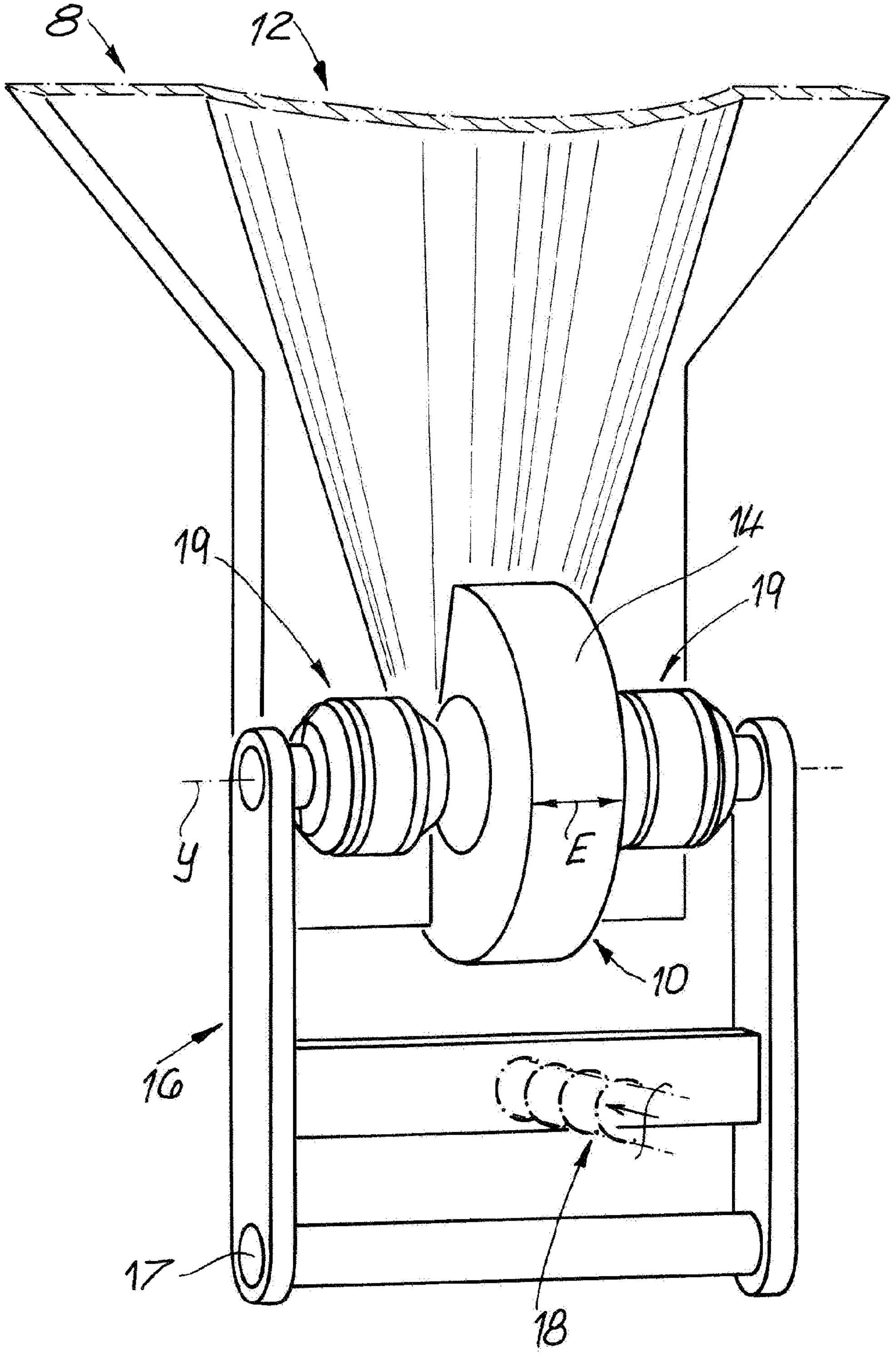
FIG. 5 is a perspective view from outside of the end plate with the end roller according to FIG. 4.

At each of the two end plates 8, a single respective end roller 10 is mounted level with the respective main-roller axes X or X', rotatable about its end-roller axis Y, and axially delimiting the roller gap S. In the illustrated embodiment, the end rollers 10 are not fastened to the end plates 8 but are each movable independently of a biasing force toward the respective main-roller end face, so that the end roller 10 can be pressed back against the biasing force during operation of the roller press. According to the invention, therefore, both the end plates 8 can be pressed back against the biasing force during operation of the roller press independently of one another and in particular against different forces. For this purpose, the end rollers 10 are mounted on the press frame 2 so as to be movable and biased independently of the respective end plate 8. In the illustrated embodiment, the end rollers 10 are each rotatable on a respective end-roller mount 16 that itself is movable relative to and biased toward the press frame 2. The drawing shows that here the end-roller mount 16 is pivotable and actually is a rocker 16 pivoted on the press frame 2 about a respective pivot axis 17 fixed on the press frame. Such a rocker 16 can have as shown in FIGS. 4 and 5 two side arms carrying on their ends respective main roller bearings 19 flanking the respective main roller [10]. FIG. 2 shows how a respective spring 18 is braced between the press frame 2 and each rocker 16 between the respective end roller 10 and axle 17. In another optional and unillustrated embodiment the springs 9 can engage the rocker level with the end roller 10. Here the springs 9 and 18 are preferably mechanical coil springs. The springs 9 that bias the end plates 8, mechanical springs are used. The end roller 10 or its mount could also be biased by a hydraulic system for example a hydraulic cylinder that is not shown in the drawing. Hydraulic (or pneumatic) cylinders have the advantage that their spring force is variable so that for example during assembly the spring force can be set to the required level. Particularly preferably, the springs 18 for the main rollers, on the one hand, and the springs 9 for the end plates 8, on the other hand, are designed in such a way and consequently matched to one another such that a greater pressure is exerted on the material in the filling funnel and consequently on the particle stream than by the end rollers 10 on the end plates 8. Moreover, the springs can of course also be connected via force-transmission means to the end plates or main rollers, for example by push rods or the like. These are not shown.

Figure 3:
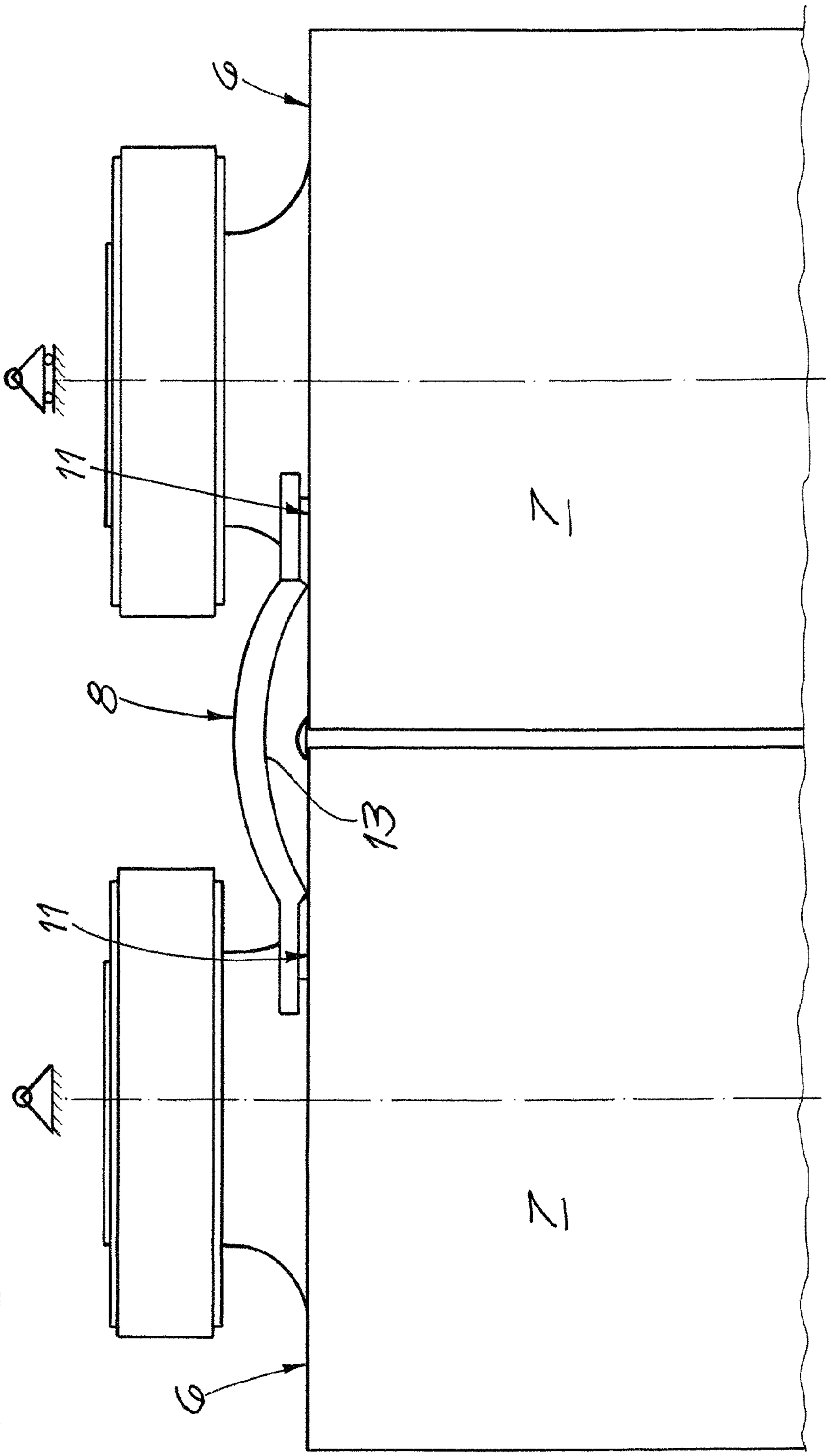
FIG. 3 is a top view of the structure shown in FIG. 2.

As explained, the end rollers 10 are mounted on and biased relative the press frame 2 independently of the respective end plates [8]. However, they are each positioned at the respective end plate 8 and preferably immediately axially outwardly of the respective end plate 8. For this purpose, each end plate [8] has a hole 15 through which passes the respective end roller 10 directly axially outwardly of the end plate 8. Even if the end plate 8 and the end roller 10 are mounted and biased independently of one another, they functionally form a unit during operation. Here, each of the two end plates 8 has a planar inner face 11 directed axially toward the respective main-roller end face 6 and parallel to the respective main-roller end face 6. Here, a material-guiding pocket 12 axially outward of the previously defined inner face 11 is integrally formed in each of the end plates 8 above the respective end roller 10 so that the end roller 10 can be fed from above with material via the guide pocket 12. The guide pocket 12 consequently has an inner face 13 offset axially outward from the respective inner face 11 and at least locally offset from the main roller inner face 6 that here is designed to be curved both in a vertical section according to FIG. 2 and in top view according to FIG. 3. In the preferred illustrated embodiment, this material-guiding pocket 12 is funnel-shaped in side view or in a perspective view from the inside (according to FIG. 4), i.e. it has a downwardly tapering width B. In addition, the material-guiding pocket can have a downwardly decreasing depth T (see FIG. 2). The material is fed via the material-guiding pockets 12 from above into the region of the two end rollers 10 axially flanking of the roller gap S. Excess material is held in the axially outer regions of the main rollers 3 and 4 via the material-guiding pockets 12. Due to the axially outwardly offset face 13 of the material-guiding pocket 12, the influence of friction that affects feed of the material is shifted axially outward from the roller gap so that the material flows better at the main roller ends and is better drawn in. The end rollers 10 at the same time considerably reduce friction at the compression zone 5, on the one hand minimizing wear and on the other hand improving distribution of the material over the gap width.

The advantages described in connection with the embodiment according to FIG. 4 can also be realized with an embodiment that is not shown in detail. In this case, the material-guiding pocket 12 also has a downwardly tapering width B. In contrast to the illustration in FIG. 2 however, the material-guiding pocket has a depth T that is constant over its height, so that the face of the material-guiding pocket is oriented substantially perpendicularly. Details are not shown.

It can also be seen in FIG. 1 that the upper vertex **10*a* of the illustrated end roller 10 is above the main-roller axes X and X'. The lower apex 10*b* of the end roller 10 is below the main-roller axes X or X'. In the illustrated embodiment according to FIG. 1, the upper vertex 10*a* is above the compression zone 5, while the lower apex 10*b* is below the compression zone 5. According to FIG. 1 the compression zone 5 is the zone of the roller press, extending between the two main rollers over a circumferential angle an of −5° to +15°, specifically with respect to the horizontal plane of the main-roller axes X and X'. Consequently, the compression zone 5 is, by definition, the region that starts +15° above the main-roller axis and ends −5° below the main-roller axes X and X'. In this case, the end-roller axis Y of the end rollers 10 here lies on or approximately on the plane of the axes X and X' of the main rollers 3 and 4. It should be noted here that the diameters of the main rollers 3 and 4 on the one hand and of the end rollers 10** on the other hand are not shown to scale.

The axial width E of each of the end rollers 10 is greater than the maximum gap width W and consequently greater than the zero gap of the roller gap S plus at least the distance to which the roller gap opens by horizontal movement of the movable main roller 4 during machine operation. The main roller width E means the axial width, that is to say the width of the working surface of each of the end rollers.

The main roller outer surface 7 of the main rollers 3 and 4 is generally provided with a special finish, for example with a wear-resistant coating or jacket. Details are not shown in the drawing. In preferred embodiments, the outer surface 14 of the end rollers 10 can also be provided with a wear-resistant coating. These cylindrical outer surfaces 14 of the end rollers 10 can consequently have a wear-resistant design or have a wear armor. In this wear armoring of the end rollers 10, known measures for the wear armoring of the main roller surfaces can be employed. Thus, for example, a plurality of bolts can be integrated in a knob-like manner into the outer surface (stud lining). Alternatively, a wear armor may be realized from a plurality of tile-like wear elements attached to the surface. Furthermore, wear armor can be by a built-up weld. The main roller itself is always preferably made of steel and the wear armor is on the outer surface of this main roller from a hard, wear-resistant material. Optionally or additionally, the outer surface 14 of the end rollers can be equipped with a profiling or structuring. Details are not shown. Moreover, there is the possibility that the end rollers 10 are each driven by a drive. Such a drive is not shown in the drawing. Furthermore, guide structures for guiding the material onto the end rollers 10 can be integrated into the material-guiding pockets 12, but such guide installations are also not shown. However, FIG. 4 shows in a simplified manner that the end plates 8 can each be provided with one or more additional sealing plates 20, for example, parallel to the inner face 11 or extend in the inner face 11 and partially cover the material-guiding pocket 12 on the front side. In this way, the supply of the material into the region of the end roller 10 and at the high-compression zone 5 can be optimized.

Finally, FIGS. 4 and 5 show that the end plates 8 each have an opening or hole 15 through which the respective end roller 10 rotatably mounted axially behind the end plate 8 passes. In a region below the material-guiding pocket 12. Consequently, the end plates 10 are mounted on the axial outer face of the end plates 8, it is mounted so as to be rotatable about their axes Y.

The end roller 10 or the body thereof is thus in a pocket-like recess 12' of the end plate 8 below the material-guiding pocket 12, i.e. the funnel-shaped material-guiding pocket 12 opens on the underside into the pocket 12 or into the recess 15 for the end roller 10. The end roller 10 or its body thereof engages through the hole 15.

Moreover, there is optionally also the possibility of equipping the end plates, e.g. their inner face 11 and the material-guiding pockets 12, with a wear armor. In this case, the end plates can be, for example, made from steel and a wear armor can be on the respective surfaces.

The invention claimed is:

1. A high-pressure roller press comprising:

a press frame;

two main rollers rotatable about respective main-roller axes in the press frame, together forming a filling funnel level with the main-roller axes, and having a gap width that is variable during operation of the roller press;

respective end plates axially flanking and delimiting the filling funnel between axially outwardly directed end faces of the main rollers, the end plates being mounted on the press frame so as to be axially movable;

respective end rollers movable axially inward toward the end plates, each end roller being laterally adjacent the main rollers vertically level with the roller gap width, rotatably mounted about its end-roller axis, and laterally delimiting the roller gap width, the end rollers being movable relative to the respective end plates; and means for urging each of the end plates by biasing forces axially toward of the respective main-roller end faces, the end rollers being pressed axially outward against the biasing forces during operation of the roller press.

2. The roller press according to claim 1, wherein the end rollers are each mounted on the press frame so as to be movable and are each biased independently of the respective end plates.

3. The roller press according to claim 1, further comprising:

respective end-roller mounts rotatably carrying the end rollers and mounted on the press frame in a movable and biased manner.

4. The roller press according to claim 3, wherein each end-roller mount is a rocker pivoted on the press frame for rocking about a respective pivot axis.

5. The roller press according to claim 3, further comprising:

respective spring elements biasing the end rollers or the respective end-roller mounts, forming the means, supported on the press frame, and bearing against the respective end roller or end-roller mount.

6. The roller press according to claim 5, wherein the spring element is a mechanical, hydraulic or pneumatic spring with adjustable and controlled or controllable spring force.

7. The roller press according to claim 1, further comprising:

respective spring elements biasing the end rollers and the end plates, forming the means, and exerting a greater pressure on material in the funnel with the end rollers than with the end plates.

8. The roller press according to claim 1, wherein one of the main rollers is a fixed main roller and the other of the main rollers is a movable main roller that is movable relative to the fixed main roller, the press further comprising:

force-generating means urging the movable main roller radially against the fixed main roller to vary the gap width during operation.

9. The roller press according to claim 1, wherein the end plates each have an inner face facing the respective main-roller end face and oriented parallel to the respective main-roller end face, and a material-guiding pocket integrated into the end plate above the end roller on the respective end plate and recessed with respect to the inner face so that the end roller can be supplied with material from above via the material-guiding pocket.

10. The roller press according to claim 9, wherein each material-guiding pocket is formed in side view like a funnel with a width tapering downward or with a downwardly decreasing axial dimension.

11. The roller press according to claim 9, wherein the end plates each have a hole through which passes the respective end roller rotatably mounted behind the end plate into a region of the material-guiding pocket or into a region below the material-guiding pocket.

12. The roller press according to claim 9, further comprising:

one or more guide elements for guiding the material onto the end rollers and integrated into the material-guiding pockets.

13. The roller press according to claim 9, wherein the end plates are each provided with one or more additional sealing plates that are parallel to the inner faces of the end plates or extend on the inner faces and partially cover the material-guiding pocket on an axial inner side.

14. The roller press according to claim 1, wherein an upper apex of each of the end rollers is above the main-roller axes or a lower apex of each of the end rollers is below the main-roller axes.

15. The roller press according to claim 1, wherein an upper apex of the end roller is above a compression zone between the main rollers and end plates or a lower apex of the end roller is below the compression zone.

16. The roller press according to claim 1, wherein the end-roller axis of each of the end rollers is vertically level with the main-roller axes.

17. The roller press according to claim 1, wherein diameters of the end rollers are at least 5% of diameters of the main rollers or the diameter of each of the end rollers is at least 50 mm.

18. The roller press according to claim 1, wherein an axial width of each of the end roller is greater than a maximum roller gap width or a width of each of the end rollers is about 1% to 10% of the diameter of the main rollers, or a width of each of the end rollers is at least 50 mm.

19. The roller press according to claim 1, wherein each end roller has an outer surface that is profiled or structured or each end roller has wear-resistant armor on its end-roller outer surface.

20. The roller press according to claim 1, wherein each end roller is driven without its own drive by material in contact with the end roller or by the end faces of the main rollers.

21. The roller press according to claim 1, wherein the end rollers are driven by a drive.

* * * * *